H. E. BUCK.
CHASSIS CONSTRUCTION ON MOTOR VEHICLES.
APPLICATION FILED MAY 7, 1917.

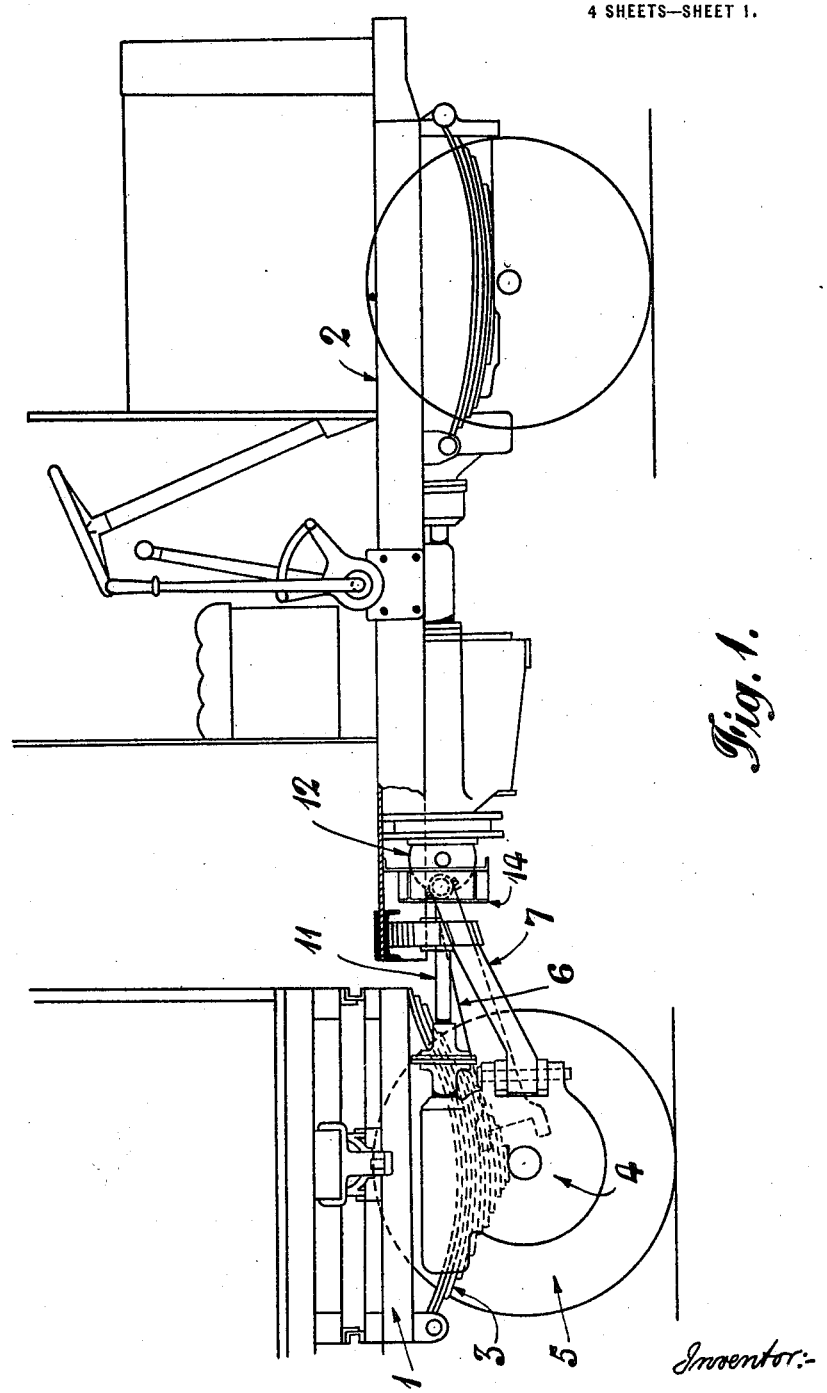

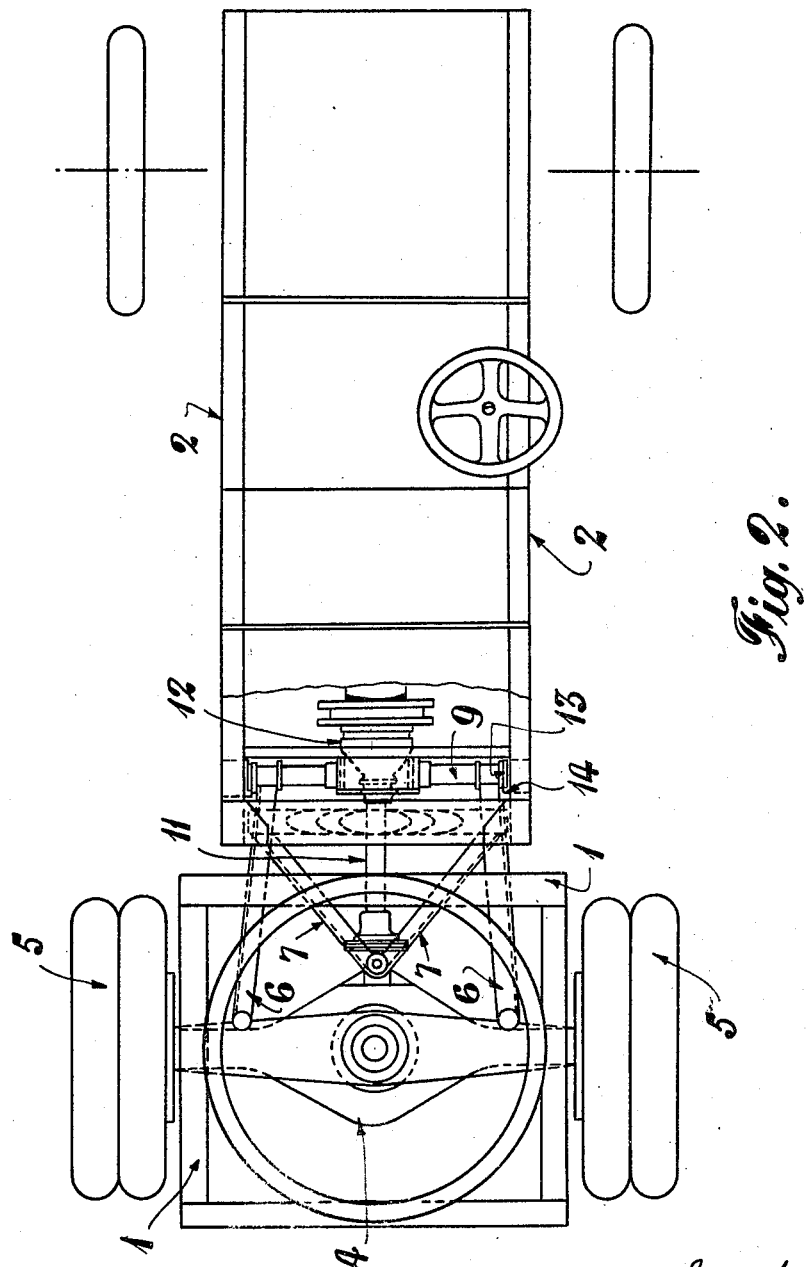

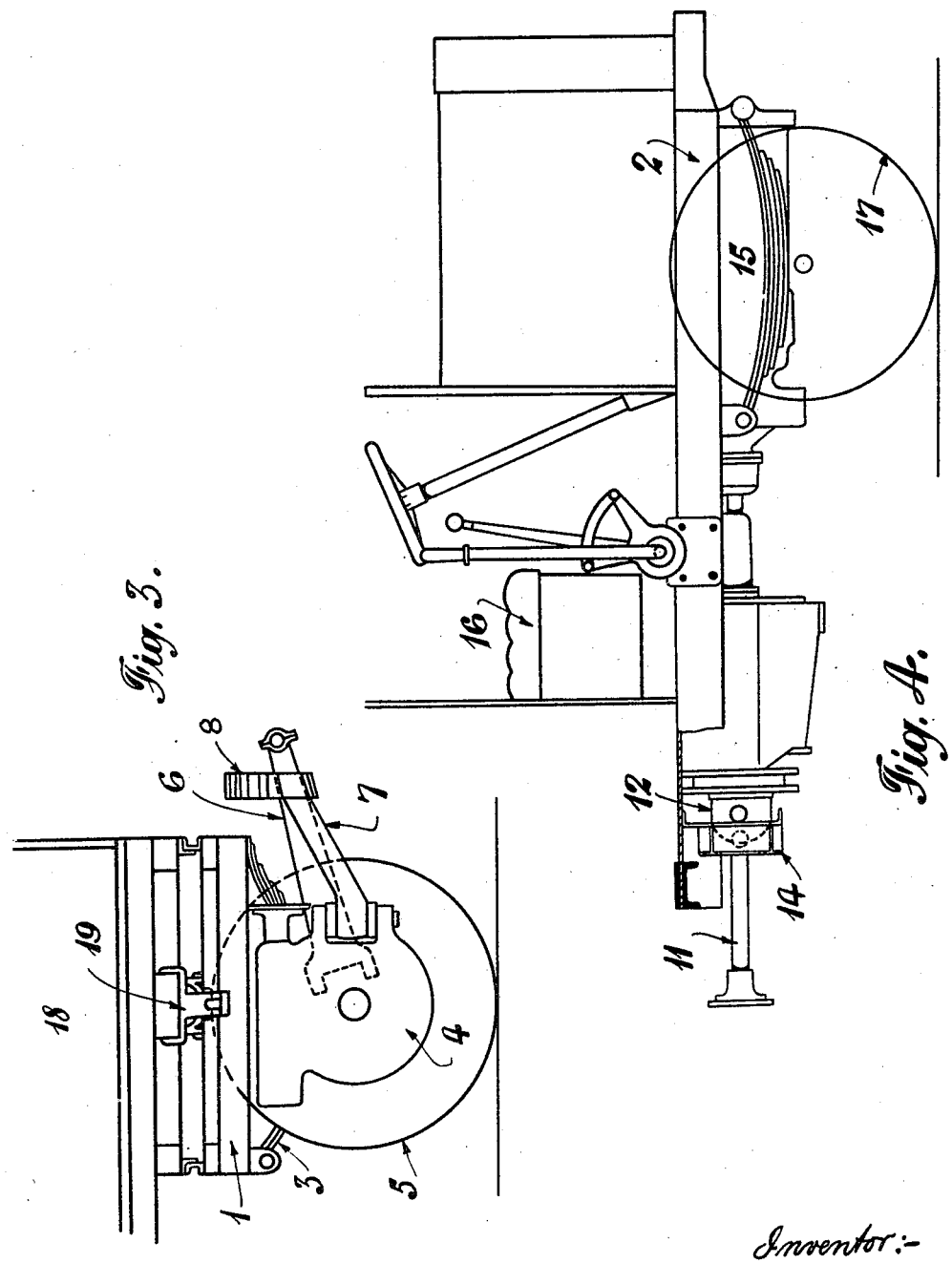

1,323,739.

Patented Dec. 2, 1919.
4 SHEETS—SHEET 4.

Inventor:-
Harold Ellis Buck
By his Attorney:- Walter Gunn

UNITED STATES PATENT OFFICE.

HAROLD ELLIS BUCK, OF SWINTON, ENGLAND.

CHASSIS CONSTRUCTION ON MOTOR-VEHICLES.

1,323,739.   Specification of Letters Patent.   Patented Dec. 2, 1919.

Application filed May 7, 1917. Serial No. 166,890.

*To all whom it may concern:*

Be it known that I, HAROLD ELLIS BUCK, a subject of the King of Great Britain, and Ireland, and resident of Swinton, Manchester, England, have invented certain new and useful Improvements in Chassis Constructions on Motor-Vehicles, of which the following is a specification.

This invention relates to motor vehicles of the compound or articulated chassis type and has for its object to provide an improved construction of such type of vehicle wherein the parts of the chassis may move about a transverse axis and may also swivel about a longitudinal axis, thereby allowing of each part of the chassis adapting itself according to the contour of the road, or the position of the load on the vehicle, without putting strains on the adjoining parts, said construction allowing of the independent movement of the parts without interfering with the transmission gear.

According to the invention the chassis is divided into two, or more, parts, the adjacent ends of the load-carrying and motor carrying parts being supported upon a common axle upon which are mounted the tractor wheels. The rear part of the chassis is connected to said axle to which is also connected a frame, the outer end of said frame being journaled on a cross bar, the ends of which engage guides on the front part of the chassis. The connection is such that said cross bar and guides are free to swivel independently about a longitudinal axis, while the connection of the cross-bar to the driving axle permits of relative rotary movement about a transverse axis. The center of said cross-bar coincides substantially with the center of movement of a universal joint in the Cardan shaft, the rotary movement being transmitted from the Cardan shaft to the tractor wheels through a live axle in the usual manner.

According to a modified construction the differential axle is connected to, or forms part of, the before-mentioned cross bar, in which case rotary movement may be transmitted to the road wheels through a chain drive.

The invention will be more particularly described by the aid of the accompanying drawings, in which:

Figure 1 is a side elevation of such part of a motor vehicle sufficient to show my invention.

Fig. 2 is a plan view of Fig. 1.

Figs. 3 and 4 are views corresponding to Fig. 1, but with the front and rear part of the chassis shown separated.

Figure 6:
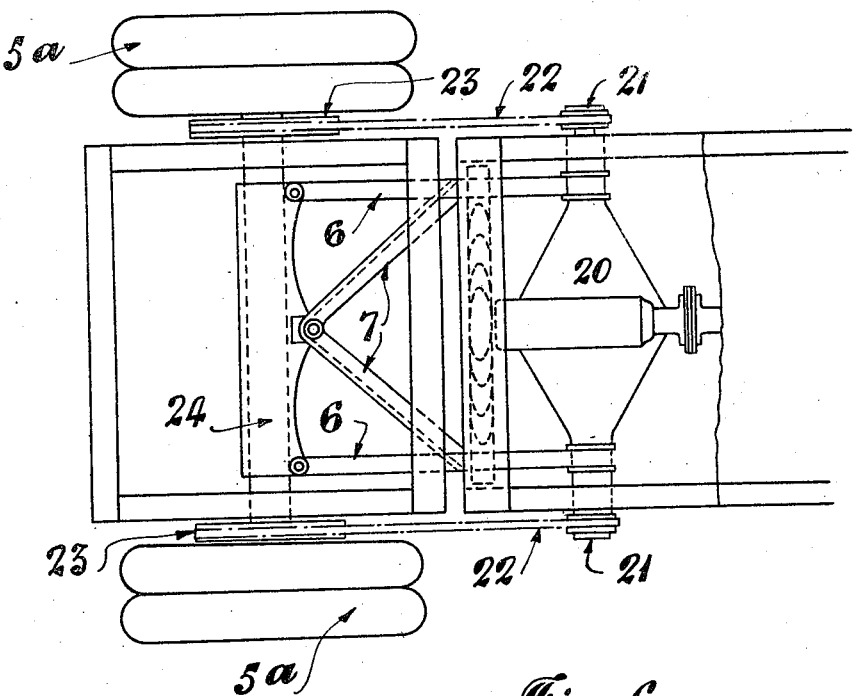
Fig. 6 is a plan view of a modified form of the device.
Figure 5:
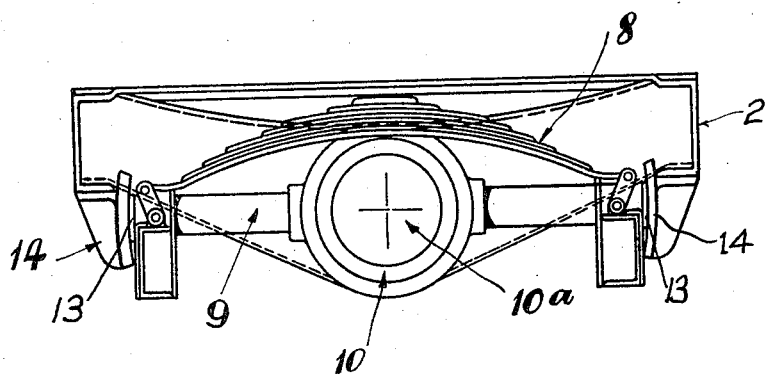
Fig. 5 is a sectional view, but to a larger scale.

Referring to Figs. 1 to 5 of the drawings, the chassis is divided into two main parts 1 and 2 of which the former, hereinafter referred to as the load frame, is adapted to carry the load, while the part 2 carries the motor and is referred to as the motor frame.

The load frame is mounted by means of the spring 3 upon the differential axle 4, to which the tractor wheels 5, 5 are connected in the usual manner. Rigidly connected to the axle 4 are two sets of stay bars 6, 6 and 7, 7 constituting a rigid under frame with said axle. Across the bars 7, 7 is arranged a transverse spring 8, the apex of which supports the rear end of the motor frame 2 as seen more particularly in Fig. 5.

Journaled in the ends of the bars 6, 6 is a cross bar 9, the center of which is formed with a collar or ring 10, through which passes the Cardan shaft 11 of the engine, said shaft being provided with a universal joint 12 whose center of movement coincides substantially with the point of intersection of the axial and transverse centers of the cross-bar 9, the movement of the Cardan shaft being transmitted to the live axle in the usual manner. The ends of the cross-bar 9 are provided with shoes 13, the outer faces of which are curved, when viewed from the end, the curves being struck from the center of the collar or ring 10. Correspondingly shaped guides 14 are secured to the frame-work 2, said guides having flanges to retain the shoes in position thereby forming a connection for the frames 1 and 2. A motor 15 is carried by the frame 2 and is controlled from the driving seat 16, which is also on the frame 2, in the usual or other convenient manner, the frame itself being provided with wheels 17 at the front and resting upon the apex of the spring 8 at the rear as before described.

The frame 1 is adapted to receive the load, the vehicle body being secured thereto; or the front part of a vehicle body 18 may be connected thereto by the swivel connection or turn-table 19, the rear of the body being supported upon independent wheels.

The disposition and arrangement of parts on the two chassis parts, or elements, 1 and 2 are clearly shown in Figs. 3 and 4 which illustrate the completed elements before being coupled together. In this position the cross bar 9 is free to rock transversely in its guides 14, consequently when said bar is connected to the stay bars 6, 6, the frame 2 is free to rock transversely independently of the axle 4 and vehicle body 18 and vice versa.

As the cross-bar 9 is rotatably mounted on the ends of the stay bars 6, 6 it follows that the frame is also free to move independently in the longitudinal direction about said bar 9 as center. As the center 10$^a$ of the cross bar 9 coincides with the center of movement of the universal joint 12, this dual movement can take place without affecting the power transmission to the driving axle. The usual clutch and change speed gear are interposed between the joint 12 and the engine 15.

Fig. 6 shows the improved chassis adapted for use with a chain drive. In this case the differential or live shaft 20 is carried at the ends of the stay bars 6, 6, after the manner of the cross bar 9 in the previous example. The casing of said live shaft is provided with curved shoes 13 engaging corresponding curved guides 14 on the frame 2 as in the last example but said guides are slotted to allow the ends of the live axle to project. Said ends are provided with sprocket wheels 21, 21 over which pass the chains 22, 22, through which the drive is transmitted to the sprocket wheels 23, 23 on the driving wheels 5$^a$, 5$^a$ mounted upon the rigid axle 24. Stay bars 7, 7 are provided to support the frame 2 through the transversely arranged spring as before described. The bars 6, 6 constitute rigid distance pieces to position the live axle relatively to the axle 24 and it will be obvious that in this case too, the frames may swivel independently about the longitudinal axis and also longitudinally about the live axle 20 as axis.

By these means the chassis can adjust itself to the inequalities both transversely and longitudinally of the road with all the wheels touching the same, without any stresses or strains being imparted to said chassis or the power transmission gear. Conversely, the chassis elements can adjust themselves independently to any inequalities of the loading.

What I claim is:—

1. In motor vehicles, an articulated chassis, tractor wheels on one element of the chassis adapted to receive the load and a motor on the other element, transmission gear for transmitting motion from the motor to the tractor wheels, means to connect the two elements of the chassis together which permit relative rotary movement of said elements about a longitudinal axis and also about a transverse axis without affecting the transmission gear, substantially as described.

2. In motor vehicles, an articulated chassis, tractor wheels mounted on one element of the chassis, to which is also connected an under carriage, a rotatably mounted crossbar on said underframe, guides on the second chassis element to receive the ends of the cross bar, a motor mounted on said second element, together with transmission means, connected to the tractor wheels, substantially as described.

3. A motor vehicle having an articulated chassis, a motor and motor controlling elements attached to one part of said chassis, tractor wheels mounted on the other chassis element, means capable of swiveling longitudinally and transversely for connecting the two parts of the chassis together, transmission gear between the motor and the tractor wheels and adapted to swivel with the chassis elements, and means to receive the load on the rear part of the chassis substantially as described.

4. A motor vehicle having an articulated chassis, a motor and motor controlled elements attached to one part of said chassis, tractor wheels mounted on the other chassis element, means capable of swiveling longitudinally and transversely for connecting the two parts of the chassis together, transmission gear between the motor and the tractor wheels and adapted to swivel with the chassis elements, together with load carrying means, on the rear chassis element, substantially as described.

5. A motor vehicle having an articulated chassis, a motor and motor controlling elements attached to one part of said chassis together with means for steering the vehicle, curved guide members on said chassis element and a cross bar having curved shoes to fit said curved guides, tractor wheels mounted on the other chassis element together with journals for the before-mentioned cross-bar and means to transmit power from the motor to the tractor wheels, substantially as described.

6. A motor vehicle having an articulated chassis, a motor and motor controlling elements together with steering means secured to the front element of said chassis, tractor wheels mounted in the rear chassis element, a cross bar rotatably mounted on said rear chassis, curved shoes at the end of said cross bar, to engage curved guides on the front chassis, a central opening in said crossbar to receive the motion transmitting shaft, a universal joint in said transmission shaft substantially coincident with the aperture in the cross-bar, substantially as described.

7. A motor vehicle having an articulated chassis, tractor wheels and load carrying means on the rear chassis member, a differential axle for said wheels, universal swiveling means to connect the two parts of the chassis together, a motor on the front chassis element together with change speed gearing and a transmission shaft leading from said motive power to the differential axis, a universal joint in said transmission shaft, the center of movement of which coincides with the center of movement of the universal connection of the chassis elements, substantially as described.

8. A motor vehicle having an articulated chassis, interconnected motive power and tractor wheels on the separate elements of said chassis, a universal swiveling connection for the two parts of the chassis and spring means to maintain the two parts of the chassis in the correct horizontal position, together with load carrying means, substantially as described.

In witness whereof I have hereunto set my hand in the presence of two witnesses.

HAROLD ELLIS BUCK.

Witnesses:
 HENRY JUNCA,
 MARION E. CLOUD.